Dec. 22, 1970 J. W. TROSTLE ET AL 3,548,555
SHUTTER STRUCTURE
Filed Jan. 10, 1969 2 Sheets-Sheet 1

INVENTORS.
JOHN W. TROSTLE,
ELTON G. KAMINSKI &
RICHARD J. HASSELBECK
BY Arnold B. Silverman
Attorney Dec. 22, 1970 J. W. TROSTLE ET AL 3,548,555
SHUTTER STRUCTURE
Filed Jan. 10, 1969 2 Sheets-Sheet 2
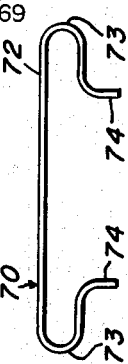
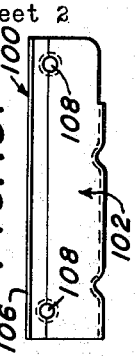
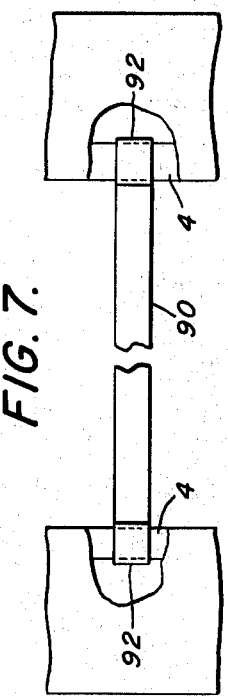
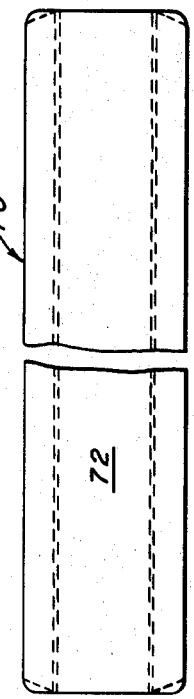
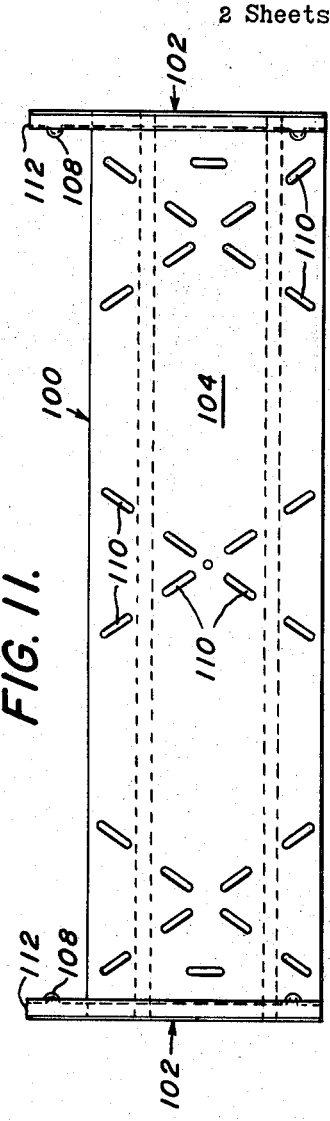
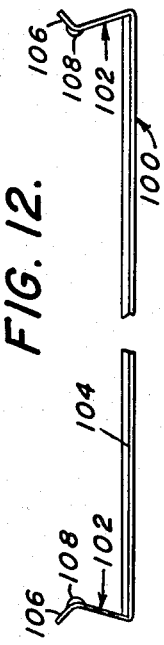
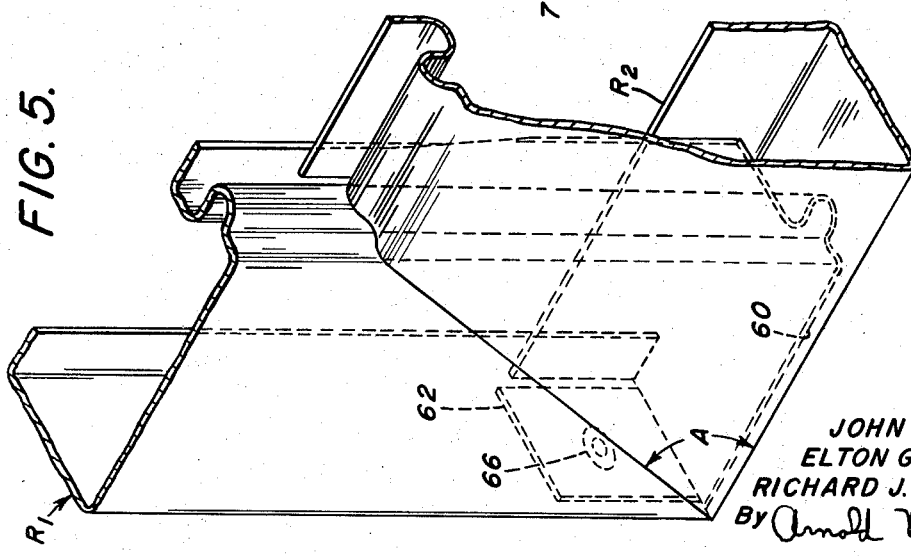
INVENTORS.
JOHN W. TROSTLE,
ELTON G. KAMINSKI &
RICHARD J. HASSELBECK
By Arnold B. Silverman
Attorney

United States Patent Office 3,548,555
Patented Dec. 22, 1970

3,548,555
SHUTTER STRUCTURE
John W. Trostle, Allison Park, Pa., and Elton G. Kaminski, Sidney, and Richard J. Hasselbeck, Houston, Ohio, assignors to Aluminum Company of America, Pittsburgh, Pa., a corporation of Pennsylvania
Filed Jan. 10, 1969, Ser. No. 790,316
Int. Cl. E04c 2/38; E06b 7/08
U.S. Cl. 52—473                                11 Claims

ABSTRACT OF THE DISCLOSURE

A shutter member having rearwardly open rail sections defining a rectangular shutter frame. The vertical rail sections have an outwardly open first channel adapted to receive an anchoring member and an inwardly open second channel adapted to receive a lateral edge of a shutter panel. A cove transition portion disposed intermediate the front wall of the rail and the first channel. A mullion adapted to receive the convex portion of the first channels in a snap fit and resist relative closing movement of the vertical rails. Resilient anchoring means extending over the convex portion of the second channels and into the first channels. Locking means for resisting vibration of portions of the shutter assembly and resisting relative separating movement of the vertical rails.

BACKGROUND OF THE INVENTION

(1) Field of the invention

This invention relates to a shutter structure having component members adapted for assembly into a tight, vibration-free unit. More specifically, this invention provides a rail structure which is adapted to receive and secure a shutter panel, a mullion and resilient shutter anchors into a rattle-free, attractive shutter assembly.

(2) Description of the prior art

It has been known to provide functional or decorative shutter structures having a suitable generally rectangular frame member and one or more louver panels secured within the frame member. A mullion or divider strip has frequently been employed for both structural reinforcement and decorative effect.

While such structures were originally generally made of wood, in more recent years shutters made from materials such as metal or plastic have also been known. Shutters made from these latter materials have employed either individual louver slats which are assembled to form a unitary louvered structure or a corrugated panel structure which simulates the appearance of a louvered structure. Disclosures of such structures are contained in U.S. Pats. 3,055,467, 3,191,242, 3,394,518 and 2,835,001.

One of the advantages of using a metal or plastic shutter in lieu of wood is the reduced susceptibility to wear and damage and the resultant reduced need for maintenance. Unlike the wooden structures, these shutters generally are free from warpage, require little or no maintenance of the decorative finish and in general resist damage from exposure to various types of weather, as well as other causes of deterioration. One of the major problems encountered with structures assembled from these other materials has been the lack of vibration resistance and rattle-free characteristics. This not only results in susceptibility to damage and wear, but also frequently produces undesirable and disturbing noises. The problem is particularly acute in areas which customarily have relatively high velocity winds.

Another problem prevalent with existing shutter structures be they made from wood or other materials, is the lack of design features uniquely adapted for assembling the shutter components into a strong unitary shutter assembly. Also lacking, is the freedom to relatively easily disassemble the shutter, reduce its size in the field to meet the needs of its specific installation and reassemble the shutter for hanging.

Yet another problem with existing shutters which are employed as a substitute for wooden shutters is the lack of aesthetic appeal. They, in general, lack the same desirable appearance features such as mitered frame corners, cove or molding contour adjacent the shutter panel and panel recess to create the desired "shadow line."

With conventional decorative wooden shutters, fastening to a wall is generally accomplished by means of a fastener such as a nail or a screw which is passed completely through the shutter frame from front to rear. This method of fastening, not only results in impairment of the physical properties of the shutter, but also results in a visible shutter fastener which detracts from shutter appearances. In addition, ready removal of the shutter is not attainable.

U.S. Pats. 2,891,757 and 3,165,287 disclose shutter hangers which are designed to be hidden from view and yet facilitate nondestructive removal. These hangers provide complementary male and female members which are secured to the wall and shutter and are adapted for relative sliding engagement and disengagement. A resilient hidden shutter bracket is disclosed in U.S. Pat. 3,341,994.

None of these hidden shutter hanging brackets provide complementary shutter rail structures uniquely adapted to receive a resilient shutter anchor to obtain maximum rattle-free shutter retention.

SUMMARY OF THE INVENTION

The shutter member of this invention solves the above enumerated problems with respect to retention of a suitable appearance, while improving the structural properties. This invention provides a shutter rail structure which has a unique configuration designed to be cooperatively secured with a shutter panel, a mullion, resilient shutter anchors and a locking strap.

The shutter frame is generally hollow and has vertical rail sections provided with a front wall and rearwardly directed flange portions extending from the inner and outer lateral edges of the front wall. The flange extending from the outer lateral edge has an inwardly directed terminal portion. The flange depending from the inner lateral edge is generally S-shaped and defines two integral channels which are open in opposite directions. A first channel is open outwardly and positioned rearwardly of the front wall. The first channel is adapted to receive a resilient flange of an anchor member. A second channel is spaced inwardly with respect to the first channel and adapted to receive a lateral edge of a shutter panel.

A mullion has lateral rearwardly directed re-entrant portions terminating in rearwardly directed flanges. Opposed ends of the mullion have recesses of complementary configuration with respect to the convex surface of the first channel. The mullion is adapted to receive these complementary convex portions of the first channels of opposed vertical rails and be retained within the shutter assembly by means of this engagement. This engagement is preferably a snap fit. The mullion resists relative closing movement of the vertical rails.

The shutter rails of this invention may be so designed as to provide the appearance of mitered corners, cove structure adjacent the shutter panel and recessed shadow line.

Locking means may assume the form of a tie strap which is disposed rearwardly of the shutter frame and secured over the convex surface of the second channels of opposed vertical rails. The tie strap ends may be received in the first channels. The locking means serve to urge the vertical rails toward each other and thereby resists relative separating movement of the vertical rails and increases the tightness of the assembly.

It is an object of this invention to provide a shutter assembly of improved durable, vibration-free characteristics and of pleasing aesthetic appearance.

It is another object of this invention to provide a shutter rail frame having integral structural means for receipt end engagement with a shutter panel, a mullion and shutter anchors.

It is another object of this invention to provide a shutter structure which will provide the desired noise inhibiting characteristics.

It is another object of this invention to provide a decorative shutter having a mitered corner joint appearance and a molding or cove appearance adjacent the exposed portion of the shutter panel.

It is another object of this invention to provide such a shutter which may be readily disassembled, cut to size in the field and subsequently reassembled.

It is another object of this invention to provide a shutter which may be secured to a wall member by means of hidden resilient fasteners and may readily be dismounted all without impairment of the shutter structure.

It is yet another object of this invention to provide such a shutter which may be readily produced in economic fashion without meaningful additional material or labor expense.

These and other objects of the invention will be more fully understood from the following description of the invention upon reference to the illustrations appended hereto.

BRIEF DESCRIPTION OF THE DRAWINGS

FIG. 5 is a fragmentary perspective view of a simulated miter joint.

FIG. 7 is a fragmentary view illustrating the front of a shutter assembly and one form of locking means.

FIG. 8 is a front elevational view of a form of mullion.

FIG. 9 is a side elevational view of the mullion of FIG. 8.

FIG. 10 is a right side elevator of a mullion of FIG. 8.

FIG. 11 is a front elevation of a form of anchoring bracket for securing the shutter to a wall structure.

FIG. 12 is a bottom plan view of the anchoring bracket shown in FIG. 11.

FIG. 13 is a right side elevation of the anchoring bracket shown in FIG. 11.

DESCRIPTION OF THE PREFERRED EMBODIMENTS

Figure 1:
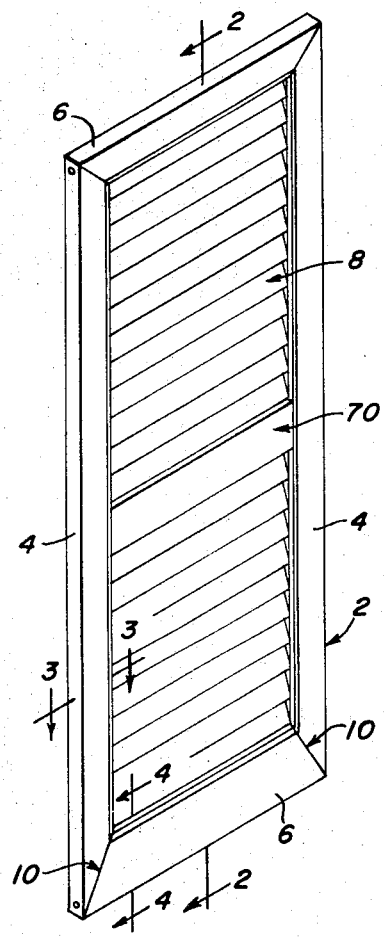
FIG. 1 is perspective view of a form of shutter structure of this invention.

Referring now to the drawings in greater detail, FIG. 1 shows a shutter having a generally rectangular shutter frame 2 defined by vertical rail sections 4 and horizontal rail sections 6. Secured within the shutter frame is a shutter panel 8. In the form illustrated in FIGS. 1 and 2, the panel 8 is a corrugated panel having a louvered appearance. If desired, a shutter panel assembled from indivdiual slat elements to create an actual or simulated louvered structure may be employed. The rail sections 4, 6 are secured to each other at opposed ends to form joints 10 which have the appearance of mitered joints.

Figure 3:
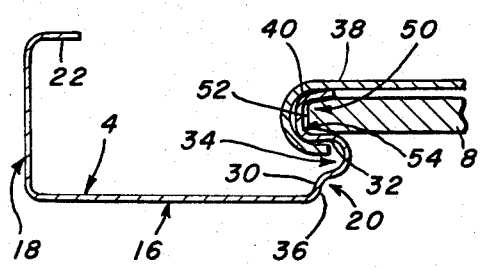
FIG. 3 is a fragmentary sectional view through section 3—3 of FIG. 1 showing a cross-section of a vertical rail of this invention.

FIG. 3 illustrates the cross-sectional configuration of the vertical rail 4. The vertical rail 4 has a front wall 16 with rearwardly directed flanges 18, 20. The rail 4 is, therefore, a hollow structure and in the form shown is rearwardly open. Outer flange 18 extends generally rearwardly from the outer lateral edge of front wall 16 and terminates in a re-entrant portion 22.

Inner flange 20 is generally S-shaped and extends generally rearwardly from the inner lateral edge of front wall 16. The S-shaped flange 20 has a first inwardly directed wall portion 30 and a first outwardly directed wall portion 32 which combine to define an outwardly open first channel 34. In the form shown, a cove section 36 is disposed within the S-shaped flange 20 intermediate the front wall 16 and the first channel 34. The cove section 36 has a forwardly and inwardly facing concave surface. This cove section 36 not only creates the cove or molded appearance but it also creates a spacing between front wall 16 and first channel 34. This increases the amount of recess of panel 8 with respect to rail front wall 16 to establish the desired shadow line.

The first channel 34 is adapted to receive an anchor member 38 which is preferably resilient, at least in part, in order to secure the shutter to a wall structure. The term "receive" as used herein in this context refers to the anchor member 38 engaging at least one of the wall portions 30, 32 and is not limited to actual penetration of a portion of anchor member 38 into the mouth of first channel 34. The channel 34 provides a recess for permitting an interference fit between the anchor 38 and the rail 4 to resist relative separation. In the preferred form, the portion of anchor 38 contacting rail 4 will be resilient and separation of the shutter rail 4 and anchor 38 may be effected by application of sufficient force to deflect resilient anchor 38. This force level will be sufficiently high that separation will not occur accidentally.

First outwardly directed wall portion 32 cooperates with second inwardly directed wall portion 40 to define second channel 50. First outwardly directed wall portion 32 has its origin approximately in the center of the base of first channel 34 and terminates approximately in the center of the base of second channel 50. Second channel 50 receives and secures a lateral edge 52 of panel 8.

The inner flange 20 of vertical rail 4, therefore, defines a first channel 34 for receipt of an anchor member 38 and a second channel 50 for receipt of the shutter panel 8. In the form illustrated, first channel 34 is disposed in spaced rearward relationship with respect to the inner lateral edge of front wall 16. Second channel 50 is disposed rearwardly of first channel 34 and has wall portion 32 which is in common therewith. In the interest of increasing the amount of recess of panel 8 with respect to front wall 16 (shadow line), first channel 34 has been illustrated as being positioned rearwardly of cove portion 36 and forwardly of second channel 50. This is the preferred form. If desired, however, the relative positions may be altered and the inwardly open second channel 50 may be formed adjacent the front wall 16, with the outwardly open first channel 34 disposed rearwardly thereof.

In the form illustrated in FIG. 3 it is noted that the mouth 54 of the second channel 50 is positioned farther inwardly than the inner lateral edge of front wall 16. The second channel 50 is also of greater width and depth than the first channel 34. This is desirable in view of the depth of panel 8 and the desire for firm securement, preferably effected in part through snap fit or frictional retention, of the lateral edge 52 in second channel 50.

Figure 4:
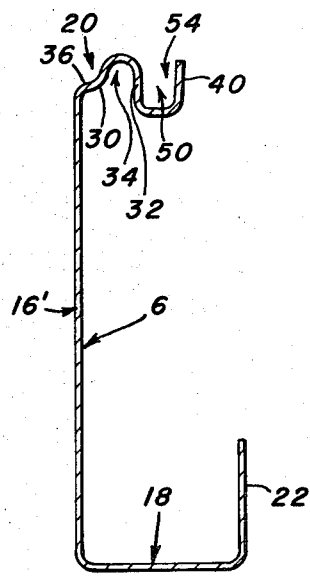
FIG. 4 is a fragmentary sectional view through section 4—4 of FIG. 1 showing a cross-section of a horizontal rail of this invention.

As is shown in FIG. 4, the transverse cross sectional configuration of the horizontal rail section 6 is substantially the same as that of the vertical rail 4, except that the front face 16 is of greater width in the former. The upper and lower edges of shutter panel 8 are received within second channel 50 of the upper and lower horizontal rail sections 6, respectively (FIG. 2).

Figure 2:
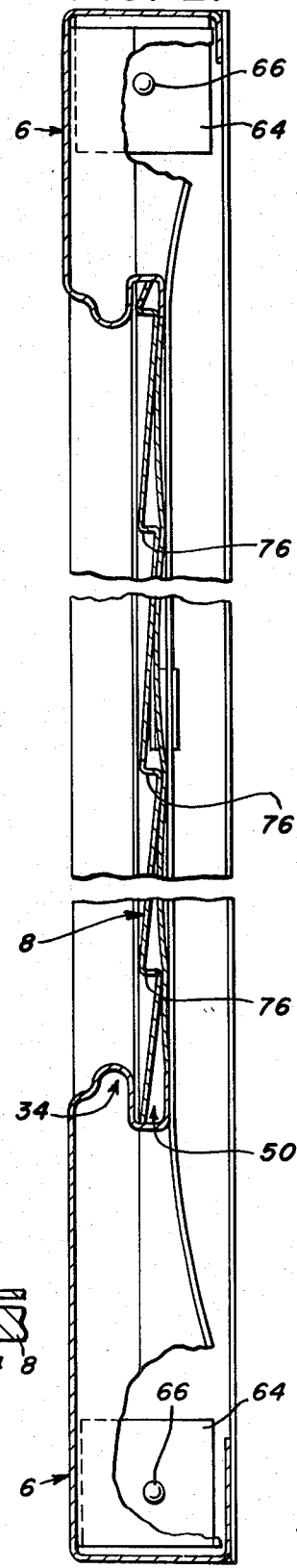
FIG. 2 is a sectional elevational view through section 2—2 of FIG. 1.
Figure 6:
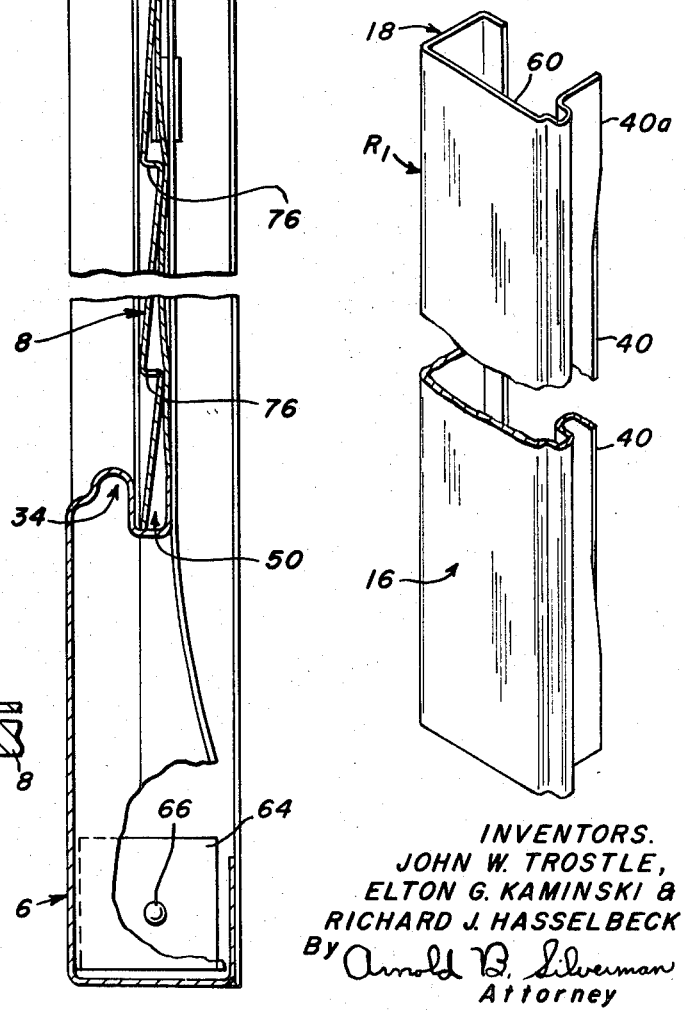
FIG. 6 is a fragmentary perspective view of a rail member illustrating the end configuration.

The details of one form of corner joint contemplated by this invention are illustrated in FIGS. 2, 5 and 6. This form of corner has the appearance of a mitered joint. The edge 60 of rail $R_1$ is substantially perpendicular to the longitudinal axis of the rail $R_1$. Also, adjacent this edge 60, the second inwardly directed wall portion 40a of second channel 50 is substantially perpendicular to front wall 16. Rail $R_2$ has an undercut edge 62 which forms an angle A with respect to the outer lateral edge of front wall 16. This angle A is preferably about 45° to 60°. An upstanding flange 64 extends from the end of outer flange 18 upwardly at a right angle with respect thereto.

In assembling the corner, the rail edge 60 is placed on flange 18 in such fashion that front face 16 of rail $R_2$ is in front of and partially concealing the front face rail $R_1$. Edge 40a also is supported by flange 18. A suitable fastener 66 such as a rivet, screw or the like is passed through upstanding flange 62 of rail $R_2$ and flange 18 of rail $R_1$, thus securing the joint.

If it is desired to retain flexibility of size and facilitate the reduction of shutter size in the field, it is preferable that $R_1$ be a vertical rail 4 and $R_2$ be a horizontal rail 6. In this fashion, after removing the fastener 66, which may conveniently be a pop-rivet, the desired amount of material may be severed from the vertical rails 4 and panel 8, while establishing a new perpendicular edge 60 on the rails. The vertical rails 4 may then be reinserted into the horizontal rails 6 and the fasteners 66 replaced. The mitered appearance is thereby retained in the shutter of reduced height.

Referring now to FIGS. 8 to 10, a mullion 70 is illustrated. The mullion has a front wall 72 with reentrant transverse edges 73. The transverse edges 73 terminate in rearwardly directed spaced flanges 74. The spacing between flanges 74 should preferably be such that they will span the distance between adjacent corrugations 76 (FIG. 2) of louvered panel 8.

As shown in FIG. 9, the ends of mullion 70 have recesses 78 which are adapted to receive the convex surface of first channel 34 of vertical rails 4, preferably in snap fit engagement therewith. In securing the mullion 70 to the shutter, the rearwardly directed flanges 74 are positioned adjacent to successive corrugations 76 of panel 8. The vertical rails 4 are urged apart and the mullion 70 is positioned so that the convex surfaces of first channels 34 engage recesses 78. The vertical rails 4 are then released. With the mullion 70 in position, the front face 72 of the mullion 70 is disposed rearwardly of front face 16 of vertical rails 4. This structure facilitates an attractive transition between the cove 36 and the front wall 72 of the mullion 70 and also produces the desired depth of shadow line.

The recesses 78 are illustrated as being generally semicircular and they are, therefore, of complementary shape with respect to the shape of the contacting portions of the first channels 34. The complementary configurations need not be semicircular, but this configuration is preferred as it improves the rattle-free characteristics of the shutter.

As a result of the intimate interconnection between the mullion 70, the vertical rails 4 and panel 8, the mullion 70 serves as a stiffener which reinforces the shutter structure. Not only does the mullion 70 stabilize the vertical rail positions, but also it resists forward movement of the panel 8.

This invention also provides locking means, such as tie strap 90. Tie strap 90 is positioned rearwardly of the shutter structure and has its opposed ends in engagement with a pair of opposed vertical rails 4 and resists relative separation thereof. The ends 92 may conveniently be received into first channels 34 of vertical rails 4. The strap 90, therefore, prevents relative separation of the rails, and if mullion 70 is employed, the strap 90 must be removed prior to mullion 70 insertion. The mullion 70 complements the strap 90 by preventing the rails 4 from moving closer to each other. Immobilizing the vertical rails in this fashion, also serves to stabilize the shutter panel 8 against lateral movement and assist in production of a tight unitary shutter structure which is resistant to rattling. The mullion 70 and strap 90 also serve to resist forward and backward movement of shutter panel 8.

One form of anchor of bracket 100 employed to secure the shutter of this invention to a wall structure is illustrated in FIGS. 11 through 13. (A different form of bracket 38 showing a different flange configuration and adapted to provide individual fasteners or anchors for each rail rather than a single spanning anchor is shown in FIG. 3.) The bracket 100 has resilient flanges 102 extending forwardly from opposed ends of bracket base plate 104. The flanges 102 extend inwardly at an acute angle with respect to base plate 104 and have outwardly directed extensions 106. The angle of inclination is preferably around 1–5 degrees with respect to a plane transverse and perpendicular with respect to the base plate 104.

In securing the shutter to the supporting structure it is preferable to employ two brackets 100 disposed adjacent the longitudinal ends of the shutter. The flanges 102 initially contact the second inwardly directed wall portion 40 of second channels 50 and are urged resiliently outwardly. As the flanges 102 move forwardly beyond the wall portion 40, they move resiliently inwardly and are received within first channels 34.

A plurality of inwardly directed detents 108 are formed within the bracket flanges 102. These detents 108 reduce the amount of force required to slide flanges 102 over the wall portion 40 of second channel 50 by reducing the amount of sliding friction between the wall portion 40 and flange 102. The detents 108 also serve to provide inwardly directed protrusions which increase the degree of interference fit between the flanges 102 and the rail 4.

The shutters can be removed from this form of attachment by supplying sufficient force to urge the flanges 102 radially outwardly and free of the vertical rails 4. While this might readily be accomplished by one desiring to remove the shutters, with or without the aid of a tool, retention is sufficiently secure that accidental removal will not occur.

The bracket may conveniently be provided with a plurality of nail holes 110 in various positions to facilitate securing the bracket 100 to the supporting structure.

As is illustrated in FIG. 11, the flanges 102 need not be coextensive with the base plate 104 and may extend transversely beyond the base plate 104. This serves to increase the amount of interfering contact between the flanges 102 and vertical rails 4. In addition, this serves to facilitate contact between the free ends 112 and the horizontal rail sections 6 when the brackets 100 are positioned adjacent opposed ends of the shutter structure thereby providing an integral guide to assist with positioning the shutter with respect to the supporting structure.

The structure of this invention is adapted to be made from various materials including metals, such as aluminum, and plastics. The rails 4, 6 and panel 8 may conveniently be formed by the press forming, brake forming, extrusion, roll forming or other convenient means.

It will be appreciated, therefore, that this invention provides a shutter which has an aesthetically pleasing appearance and a durable, rattle-free structure which may be economically produced. By means of the unique rail configuration, a rail flange defines a first channel for receipt of anchoring brackets and a second channel for receipt of the shutter panel 8. A mullion strip 70 which serves as a decorative, as well as functional, addition is positioned in contact with the panel 8 and has complementary end recesses receiving the convex surface of the first channels 34.

The shutter provides corner joints 10 having the appearance of mitered corners. The shutter also has a cove 36 portion disposed within the inner contour of the shutter frame 2.

The bracket 100 is adapted for resilient engagement and disengagement with the vertical rails 4. The bracket 100 has resilient flanges 102 which permit ready manual hanging and removal of the shutter, but resist accidental removal of the same.

An additional feature of the shutter is that it may be made in one or more standard lengths and readily cut to custom size and reassembled in the field. Such cutting does not alter the general appearance or structural integrity of the shutter.

Locking means, such as tie strap 90, serve to provide a shutter structure of increased tightness inhibiting rearward movement of the panel 8 and resisting relative separation of the vertical rails 4. This feature complements the mullion 70 which resists relative closing displacement of the vertical rails 4 and also resists forward movement of the shutter panel 8.

Whereas particular embodiments of the invention have been described for purposes of illustration, it will be evident to those skilled in the art that numerous variations of the details may be made without departing from the invention as defined in the appended claims.

We claim:
1. A shutter member, comprising:
a rectangular shutter frame defined by horizontal and vertical rail sections,
each said vertical rail section having a front wall provided with rearwardly directed flanges depending from lateral edges of said front wall,
the outer lateral edge of said front wall having an outer rearwardly extending flange depending therefrom,
said outer rearwardly depending flange having an inwardly directed terminal portion,
the inner lateral edge of said front wall member having an inner rearwardly extending flange of generally S-shaped configuration,
a first channel which is outwardly open defined within said S-shaped flange by a first inwardly directed wall portion and a first outwardly directed wall portion disposed rearwardly of said first inwardly directed wall portion,
said first channel disposed in rearwardly spaced relationship with respect to said front wall member,
said first channel adapted to receive an anchoring member in rearwardly spaced position with respect to said front wall member,
a second channel which is inwardly open defined within said S-shaped flange by said first outwardly directed wall portion and a second inwardly directed wall portion,
said second channel adapted to receive a lateral edge of a shutter panel, and
a generally rearwardly and inwardly directed transition portion of said S-shaped flange disposed between said inner lateral edge of said front wall member and said first inwardly directed wall portion of said first channel.
2. The shutter member of claim 1 including:
said horizontal and vertical rails are hollow and rearwardly open, and
said transition portion has a cove configuration with a generally forwardly and inwardly facing concave surface.
3. The shutter of claim 2 including:
said horizontal rail sections have substantially the same longitudinal cross-sectional configuration as said vertical rail sections,
a corrugated panel member of simulated louver appearance having its opposed lateral edges received within said second channels of said vertical rail members, and
the upper and lower edges of said corrugated panel member received within the second channels of said horizontal rail sections.
4. The shutter member of claim 3 including:
said shutter frame having corner joints of mitered appearance,
in each said corner joint a first rail has an edge disposed at substantially right angles with respect to the longitudinal axis of said rail and a second rail has an undercut edge,
said second rail provided with an upstanding flange extending inwardly from the longitudinal end of said rearwardly directed flange,
fastening means extending through said upstanding flange of said second rail and said outer rearwardly directed flange portion of said first rail,
said edge of said first rail received within said second rail with said front wall of the said second rail disposed in front of front wall of said first rail,
said second rail having said undercut edge disposed at an angle of approximately 45° to 60° with respect to said outer lateral edge of said front wall of said second rail,
said first rail is a vertical rail, and said second rail is a horizontal rail.
5. The shutter member of claim 2 including:
anchoring means having a base portion adapted to be secured to the structural member to which said shutter member is to be secured, and
said anchoring means having resilient flange portions disposed at opposed ends of said base portion extending forwardly beyond said second inwardly directed wall portion of said second channel and are received and resiliently engaged with said first channel.
6. The shutter of claim 5 wherein:
said resilient flanges extend inwardly at an acute angle with respect to said base portion of said anchor,
said resilient flanges having secondary terminal flanges extending outwardly,
a plurality of spaced inwardly directed detents disposed on said resilient flange adjacent said secondary flanges, and
said resilient flanges received in said first channels.
7. The shutter member of claim 6 including:
a pair of said anchoring means each engaged within said first channels of said opposed vertical rails adjacent the longitudinal ends of said shutter, and
positioning means adjacent the longitudinal ends of said anchors extending transversely beyond the lateral sides of said anchors and contacting an adjacent horizontal rail.
8. The shutter member of claim 2 including:
said first channel disposed farther inwardly than said inner lateral edge of said front wall member,
said first channel has an inwardly disposed convex outer surface adapted to be engaged by a mullion member,
the mouth of said second channel disposed farther inwardly than said inner lateral edge of said front wall member, and
said second channel is of greater depth than said first channel.
9. The shutter member of claim 8 including:
a mullion member having a front wall terminating in re-entrant transverse edges,
said edges terminating in rearwardly directed flanges,
longitudinal ends of said mullion member being recessed to provide a concave surface of generally complementary contour with respect to said first channel of said vertical rails, and
said recessed ends of said mullion receiving the said convex outer surface of first channel portions of said vertical rails.

10. The shutter member of claim 9 including:
anchoring means having a base portion adapted to be secured to the structural member to which said shutter member is to be secured,
said anchoring means having resilient flange portions disposed at opposed ends of said base portion extending forwardly beyond said second inwardly directed wall portion of said second channel and received in said first channel, and
said resilient flanges extend inwardly at an acute angle with respect to said base portion of said anchor.

11. The shutter member of claim 9 including:
locking means disposed to the rear of said shutter frame engaging said vertical rails and resisting relative outward separation of said rails.

References Cited

UNITED STATES PATENTS

| 2,835,001 | 5/1958 | Matthews | 52—473 |
| 2,869,695 | 1/1959 | Herr et al. | 52—624X |
| 2,891,757 | 6/1959 | Lang | 248—224 |
| 3,055,467 | 9/1962 | Peek et al. | 52—473X |
| 3,165,287 | 1/1965 | Parsons | 248—224 |
| 3,191,242 | 6/1965 | Rauen | 52—473 |
| 3,341,994 | 9/1967 | Olson | 52—204 |
| 3,355,204 | 11/1967 | Philpot | 52—656X |
| 3,364,643 | 1/1968 | Smith et al. | 52—473X |
| 3,394,518 | 7/1968 | Worrell | 52—473 |
| 3,461,629 | 8/1969 | Smith | 52—625X |

PRICE C. FAW, JR., Primary Examiner

U.S. Cl. X.R.

52—314, 625, 656; 248—224